(12) United States Patent
Chen et al.

(10) Patent No.: US 11,532,090 B2
(45) Date of Patent: Dec. 20, 2022

(54) ELECTRONIC DEVICE AND METHOD FOR ESTIMATING OPTICAL FLOW

(71) Applicant: Coretronic Corporation, Hsin-Chu (TW)

(72) Inventors: Yen-Yi Chen, Hsin-Chu (TW); Huai-En Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 302 days.

(21) Appl. No.: 16/784,214

(22) Filed: Feb. 6, 2020

(65) Prior Publication Data
US 2020/0273185 A1    Aug. 27, 2020

(30) Foreign Application Priority Data
Feb. 27, 2019    (CN) .......................... 201910145056.9

(51) Int. Cl.
*G06T 7/33*    (2017.01)
*G06T 1/20*    (2006.01)

(52) U.S. Cl.
CPC ............ *G06T 7/33* (2017.01); *G06T 1/20* (2013.01); *G06T 2207/20084* (2013.01)

(58) Field of Classification Search
CPC ............ G06T 1/20; G06T 2207/20081; G06T 2207/20084; G06T 3/4038; G06T 7/269; G06T 7/33
See application file for complete search history.

(56) References Cited

U.S. PATENT DOCUMENTS 10,380,753 B1 *   8/2019   Csordás et al. ....... G06V 10/751
10,542,270 B2 *   1/2020   Zhou ..................... H04N 19/187
(Continued)

FOREIGN PATENT DOCUMENTS

CN    106157249    11/2016
CN    106658023     5/2017
(Continued)

OTHER PUBLICATIONS

David G. Lowe, "Distinctive Image Features from Scale-Invariant Keypoints", International Journal of Computer Vision, Jan. 5, 2004, pp. 1-28.
(Continued)

*Primary Examiner* — Ian L Lemieux
(74) *Attorney, Agent, or Firm* — JCIPRNET

(57) ABSTRACT

An electronic device having a neural network framework for estimating optical flow is provided. The electronic device is connected to an image acquiring unit, which acquires images to be analyzed. The electronic device includes a storage unit, a feature extraction unit, an optical flow estimation unit and a refining unit. The storage unit stores a feature extraction module. The feature extraction unit is connected to the image acquiring unit and the storage unit. The optical flow estimation unit is connected to the feature extraction unit to generate an estimated optical flow. The refining unit is connected to the optical flow estimation unit to input the estimated optical flow to a refining module to obtain an estimated optical flow result. A method for estimating optical flow is also provided to reduce the number of training parameters required for estimating optical flow, thereby reducing a training time and improving training stability.

16 Claims, 9 Drawing Sheets

(56) References Cited

U.S. PATENT DOCUMENTS

| | | | |
|---|---|---|---|
| 10,671,855 B2* | 6/2020 | Lee | G06V 10/25 |
| 11,062,475 B2* | 7/2021 | Nakashima | G06N 3/08 |
| 11,083,913 B2* | 8/2021 | Lachaine | A61N 5/1037 |
| 11,122,238 B1* | 9/2021 | van Amersfoort | G06T 3/4007 |
| 2012/0321218 A1* | 12/2012 | Tsurumi | G11B 27/322 |
| | | | 382/294 |
| 2018/0205884 A1* | 7/2018 | Hornung | H04N 13/111 |
| 2019/0045168 A1 | 2/2019 | Chaudhuri et al. | |
| 2019/0332939 A1* | 10/2019 | Alletto | H04N 19/513 |
| 2020/0084427 A1* | 3/2020 | Sun | G06N 3/0454 |
| 2020/0273192 A1* | 8/2020 | Cheng | G06T 7/593 |
| 2021/0004933 A1* | 1/2021 | Wong | G06T 7/248 |
| 2021/0276598 A1* | 9/2021 | Amirloo Abolfathi | |
| | | | G06K 9/6256 |

FOREIGN PATENT DOCUMENTS

| | | |
|---|---|---|
| CN | 107146248 | 9/2017 |
| CN | 104978728 | 11/2017 |
| TW | 201544400 | 12/2015 |

OTHER PUBLICATIONS

Engin Tola et al., "DAISY: An Efficient Dense Descriptor Applied to Wide-Baseline Stereo", IEEE Transactions on Pattern Analysis and Machine Intelligence, vol. 32, No. 5, May 2010, pp. 815-830.

Christian Bailer et al., "Flow Fields: Dense Correspondence Fields for Highly Accurate Large Displacement Optical Flow Estimation", IEEE Transactions on Pattern Analysis and Machine Intelligence, vol. 41, No. 8, Aug. 2019, pp. 1879-1892.

Alexey Dosovitskiy et al., "FlowNet: Learning Optical Flow with Convolutional Networks", 2015 IEEE International Conference on Computer Vision (ICCV), Dec. 7-13, 2015, pp. 2758-2766.

Eddy Ilg et al., "FlowNet 2.0: Evolution of Optical Flow Estimation with Deep Networks" 2017 IEEE Conference on Computer Vision and Pattern Recognition (CVPR), Jul. 2017, pp. 1-9.

Anurag Ranjan et al., "Optical Flow Estimation using a Spatial Pyramid Network", arXiv:1611.00850v2, Nov. 21, 2016, pp. 1-10.

Deqing Sun et al., "PWC-Net: CNNs for Optical Flow Using Pyramid,Warping, and Cost Volume" arXiv:1709.02371v3, Jun. 25, 2018, pp. 1-10.

Christian Szegedy et al., "Going Deeper with Convolutions", 2015 IEEE Conference on Computer Vision and Pattern Recognition (CVPR), Jun. 7-12, 2015, pp. 1-9.

Kaiming He et al., "Deep Residual Learning for Image Recognition", 2016 IEEE Conference on Computer Vision and Pattern Recognition (CVPR), Jun. 27-30, 2016, pp. 770-778.

Christian Szegedy et al., "Inception-v4, Inception-ResNet and the Impact of Residual Connections on Learning" Proceedings of the Thirty-First AAAI Conference on Artificial Intelligence, Feb. 2017, pp. 4278-4284.

Sergey Ioffe et al., "Batch Normalization: Accelerating Deep Network Training by Reducing Internal Covariate Shift", arXiv:1502.03167v3, Mar. 2, 2015, pp. 1-11.

* cited by examiner

ELECTRONIC DEVICE AND METHOD FOR ESTIMATING OPTICAL FLOW

CROSS-REFERENCE TO RELATED APPLICATION

This application claims the priority benefit of China application serial no. 201910145056.9, filed on Feb. 27, 2019. The entirety of the above-mentioned patent application is hereby incorporated by reference herein and made a part of this specification.

BACKGROUND

Technical Field

The invention relates to an image processing technique, and particularly relates to an electronic device with a neural network framework and a method for estimating optical flow.

Description of Related Art

In the era of science and technology, feature matching technology is gradually widespread in our life, for example, image blending, real-time positioning and map construction, gesture recognition, image tracking, etc., all involve complex image computations. Among them, a dense matching technology is often used in panorama blending and mapping construction. Since matching accuracy may affect an image processing effect in the technique of panorama blending and map construction, if the matching is not accurate enough, a ghosting image will appear in a processed image, or a map with errors is constructed.

In the existing technique, the commonly used dense matching technology is, for example, FlowNet 2.0, however, it requires a lot of training parameters, which results in lower efficiency. SPyNet is also applied to a field of a computer vision technology. Although the number of training parameters of SPyNet is superior to that of FlowNet 2.0, the accuracy of SPyNet is less than that of FlowNet 2.0. Another commonly used technology is PWC-Net, which requires less training parameters and accuracy thereof is higher. However, PWC-Net requires a long training time. Therefore, how to find a suitable way for the computer vision technology to reduce the number of the training parameters, maintain accuracy and reduce the training time is a subject for technicians of this field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to an electronic device and a method for estimating optical flow in order to reduce the number of training parameters needed to estimate the optical flow, so as to reduce a training time and improve training stability. The electronic device has a neural network framework for estimating the optical flow.

In order to achieve one or a portion of or all of the objects or other objects, the invention provides an electronic device, the electronic device has a neural network framework for estimating an optical flow. The electronic device is adapted to connect an image acquiring unit. The image acquiring unit acquires a plurality of images to be analyzed. The electronic device has a storage unit, a feature extraction unit, an optical flow estimation unit and a refining unit. The image acquiring unit acquires a plurality of images to be analyzed. The storage unit stores a feature extraction module, and the feature extraction module has a feature extraction layer and a feature dimension reduction layer. The feature extraction unit is connected to the image acquiring unit and the storage unit, and is configured to respectively input the images to be analyzed to the feature extraction module, such that the images to be analyzed are input to the feature extraction layer to respectively generate intermediate image features corresponding to the images to be analyzed. The intermediate image features corresponding to the images to be analyzed are respectively input to the feature dimension reduction layer, so that the intermediate image features are subjected to a dimension reduction process to respectively generate image features. The optical flow estimation unit is connected to the feature extraction unit, and is configured to input the image feature of each of the images to be analyzed to the optical flow estimation module to generate an estimated optical flow. The refining unit is connected to the optical flow estimation unit, and is configured to input the estimated optical flow to a refining module to extract an estimated optical flow feature of the estimated optical flow, and integrates the estimated optical flow feature to the estimated optical flow to obtain an estimated optical flow result.

In order to achieve one or a portion of or all of the objects or other objects, the invention provides a method for estimating optical flow including following steps: acquiring a plurality of images to be analyzed; respectively inputting the images to be analyzed to a feature extraction module, where the feature extraction module includes a feature extraction layer and a feature dimension reduction layer, and the images to be analyzed are input to the feature extraction layer to respectively generate intermediate image features corresponding to the images to be analyzed, and the intermediate image features corresponding to the images to be analyzed are respectively input to the feature dimension reduction layer, so that the intermediate image features are subjected to a dimension reduction process to respectively generate image features; inputting the image feature of each of the images to be analyzed to an optical flow estimation module to generate an estimated optical flow; and inputting the estimated optical flow to a refining module to extract an estimated optical flow feature of the estimated optical flow, and integrating the estimated optical flow feature to the estimated optical flow to obtain an estimated optical flow result.

Based on the above description, in the electronic device and the method for estimating optical flow of the invention, by configuring the feature dimension reduction layer, the amount of parameters required for estimating the optical flow is reduced, so as to effectively reduce a time required for training.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "left," "right," "front," "back," etc., is used with reference to the orientation of the Figure(s) being described and are not intended to be limiting of the invention. Moreover, the terms of connection, coupling and the like used in the invention are to explain signal transmission between two devices, and are not only limited to the direct contact relationship between the two devices. In addition, the term "signal" may refer to at least one current, voltage, charge, temperature, data, electromagnetic wave or any other one or a plurality of signals.

Figure 1:
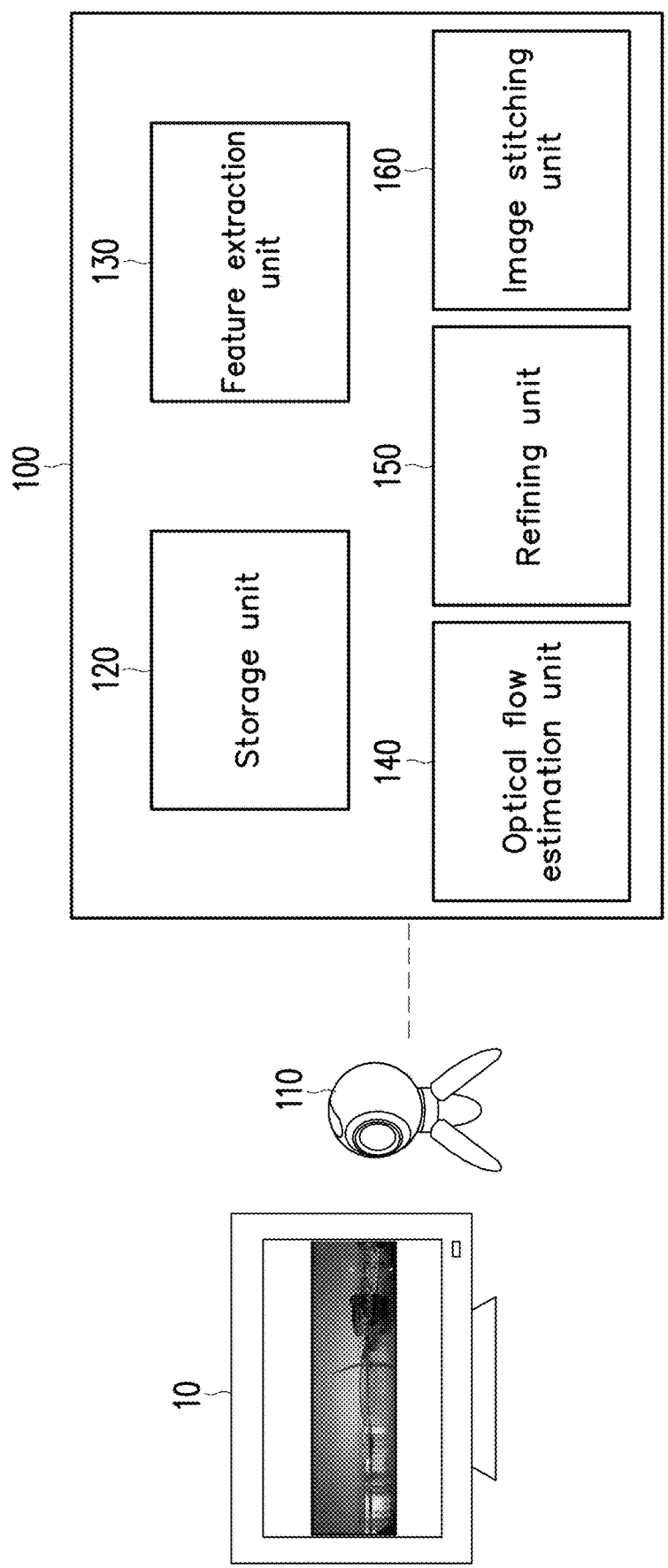
FIG. 1 is a system schematic diagram of an electronic device according to an embodiment of the invention.

FIG. 1 is a system schematic diagram of an electronic device according to an embodiment of the invention. Referring to FIG. 1, the electronic device 100 may estimate an optical flow though captured images. Moreover, according to different application situations, the optical flow estimated by the electronic device 100 may be applied to various image computations such as image blending, real-time positioning and map construction, gesture recognition, image tracking, etc. For example, in a situation shown in FIG. 1, the electronic device 100 may estimate an optical flow according to a captured image, and may stitch/bond the captured image into a panoramic image according to the optical flow for displaying in a display 10. The electronic device 100 is electrically connected to the display 10, and transmits signals to the display 10 in a wireless or wired manner.

The electronic device 100 is connected to an image acquiring unit 110. The electronic device 100 has a storage unit 120, a feature extraction unit 130, an optical flow estimation unit 140 and a refining unit 150.

The image acquiring unit 110 is used for acquiring images. Particularly, during a process that the electronic device 100 estimates an optical flow, the image acquiring unit 110 may obtain a plurality of images to be analyzed. In an embodiment of the invention, the image acquiring unit 110 is, for example, a video camera of various types, which is no limited by the invention.

The storage unit 120 is configured to store necessary programs and data for the operation of the electronic device 100. Particularly, the storage unit 120 stores a feature extraction module. In an embodiment of the invention, the feature extraction module has a feature extraction layer and a feature dimension reduction layer. The feature extraction module is, for example, stored in the storage unit 120 in form of an application or software. Moreover, during the process that the electronic device 100 estimates an optical flow, the feature extraction module is loaded and executed to analyze the images to be analyzed. Detail of the feature extraction module is described later. In an embodiment of the invention, the storage unit 120 may be various types of a non-volatile memory, for example, a Read-Only Memory (ROM), a flash, a Hard Disk Drive (HDD) and a Solid-State Drive (SSD), etc., which is not limited by the invention.

The feature extraction unit 130 is connected to the image acquiring unit 110 and the storage unit 120, and is configured to load the feature extraction module and accordingly analyze image features of the images to be analyzed. The feature extraction unit 130 is implemented in form of an application or software. The optical flow estimation unit 140 is connected to the feature extraction unit 130, and is configured to execute an optical flow estimation module to generate an estimated optical flow according to the image features. The refining unit 150 is connected to the optical flow estimation unit 140, and is configured to execute a refining module to input the estimated optical flow to the refining module to obtain an estimated optical flow result. Operation details of the feature extraction unit 130, the optical flow estimation unit 140 and the refining unit 150 are described later. In an embodiment of the invention, the feature extraction unit 130, the optical flow estimation unit 140 and the refining unit 150 are respectively implemented by a Central Processing Unit (CPU), or other programmable general purpose or special purpose microprocessor. In another embodiment of the invention, the feature extraction unit 130, the optical flow estimation unit 140 and the refining unit 150 may also be implemented by adopting the same processor to load different modules, which is not limited by the invention.

In an embodiment of the invention, the image acquiring unit 110, the storage unit 120, the feature extraction unit 130, the optical flow estimation unit 140 and the refining unit 150 are connected to each other in an external connection manner, for example, the image acquiring unit 110, the storage unit 120, the feature extraction unit 130, the optical flow estimation unit 140 and the refining unit 150 may be connected with each other in a wired or wireless manner to form the electronic device 100. Alternatively, the image acquiring unit 110, the storage unit 120, the feature extraction unit 130, the optical flow estimation unit 140 and the refining unit 150 may be combined to set in a same casing. The combination shown in FIG. 1 is only schematic, which is not intended to be limiting of the invention.

Figure 2:
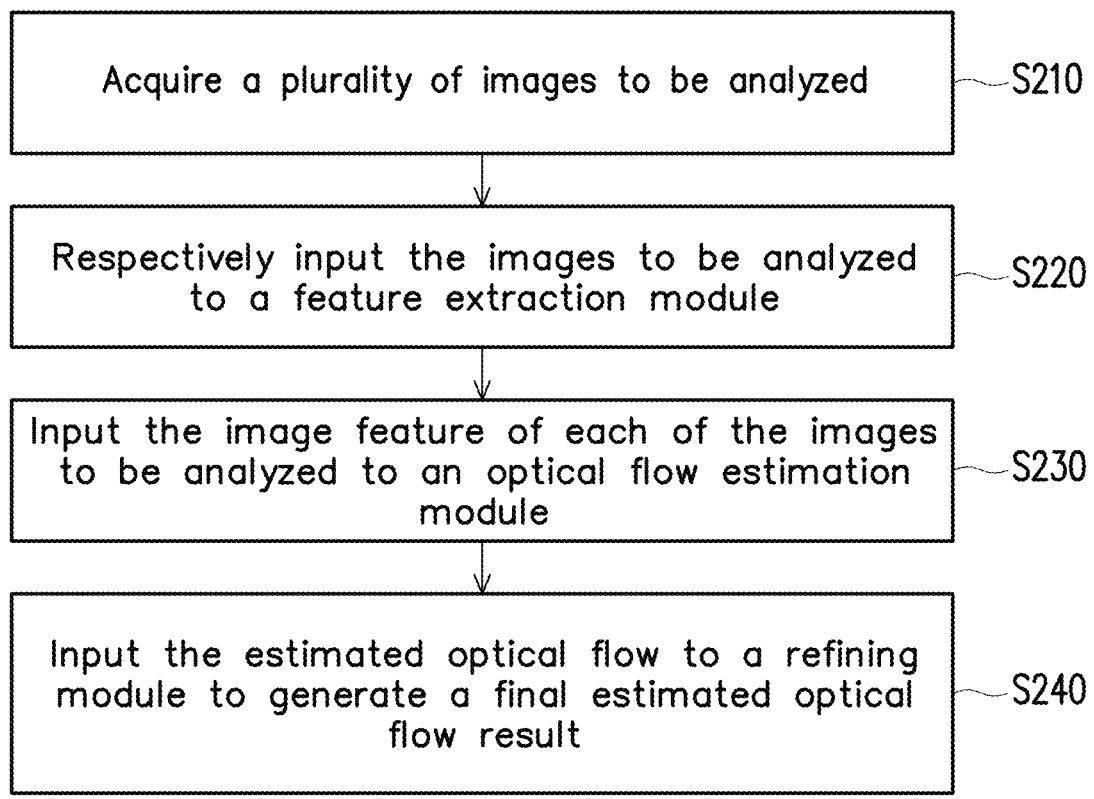
FIG. 2 and FIG. 3 are flowcharts illustrating a method for estimating optical flow according to an embodiment of the invention.
Figure 3:
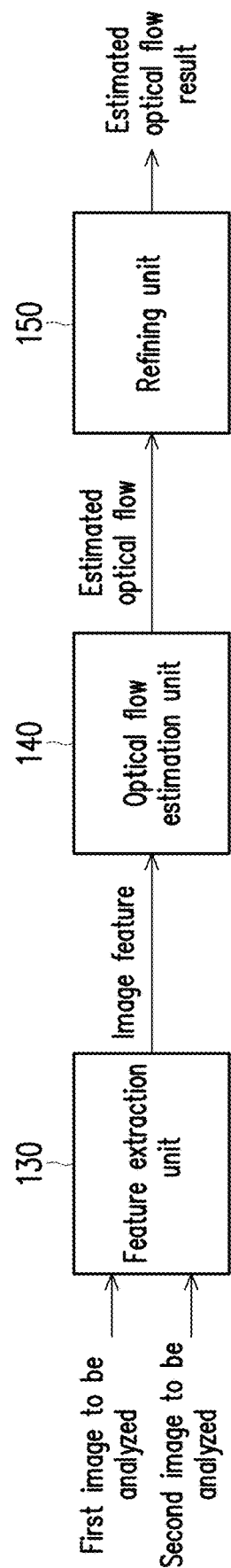

FIG. 2 and FIG. 3 are flowcharts illustrating a method for estimating optical flow according to an embodiment of the invention. The method for estimating optical flow shown in FIG. 2 and FIG. 3 is at least adapted to the electronic device 100 of the embodiment of FIG. 1, though the invention is not limited thereto. The operation method of the electronic device 100 and details of the method for estimating optical flow of the invention are described below with reference of FIG. 1 to FIG. 3.

In a step S210, the image acquiring unit 110 acquires a plurality of images to be analyzed. In the embodiment, the image acquiring unit 110 at least acquires two images to be analyzed, and at least a part of the two images to be analyzed correspond to a same scene.

In a step S220, the feature extraction unit 130 respectively inputs the images to be analyzed to the feature extraction module. In detail, the feature extraction unit 130 respectively inputs each of the images to be analyzed to the feature extraction module, and now the images to be analyzed are first input to the feature extraction layer to generate intermediate image features corresponding to the images to be analyzed. Then, the intermediate image features are respectively input to the feature dimension reduction layer, so that the intermediate image features are subjected to a dimension reduction process to generate image features. The dimension reduction process is a conventional process in this skill art. It should be noted that in the embodiment, each of the images to be analyzed is input to the same module and weight sharing is performed. Namely, the parameter used by the feature extraction module for extracting each image to be analyzed is the same.

In a step S230, the optical flow estimation unit 140 has an optical flow estimation module. The image feature of each of the images to be analyzed is input to the optical flow estimation module to generate an estimated optical flow. Namely, the optical flow estimation unit 140 estimates a possible optical flow between the images to be analyzed according to the image feature of each image to be analyzed. The optical flow estimation module is, for example, implemented in form of application or software.

In a step S240, the refining unit 150 extracts an estimated optical flow feature of the estimated optical flow, and integrates the estimated optical flow feature to the estimated optical flow to obtain an estimated optical flow result. Namely, the refining unit 150 extracts a feature in the estimated optical flow to further strengthen a feature edge in the estimated optical flow. The estimated optical flow result generated by the refining unit 150 may be applied to various image processing such as image blending, map construction, etc. For example, in an embodiment of the invention, the electronic device 100 further has an image blending unit 160 connected to the refining unit, which integrates the images to be analyzed according to the estimated optical flow result to obtain a panoramic image. The electronic device 100 transmits the panoramic image to the display 10. The image blending unit 160 is, for example, implemented in form of an application, software or a chip (hardware).

For easy understanding, details of the steps S220 to S240 are introduced below, and a first image to be analyzed and a second image to be analyzed are adopted to represent two images to be analyzed acquired by the image acquiring unit 110.

Figure 4:
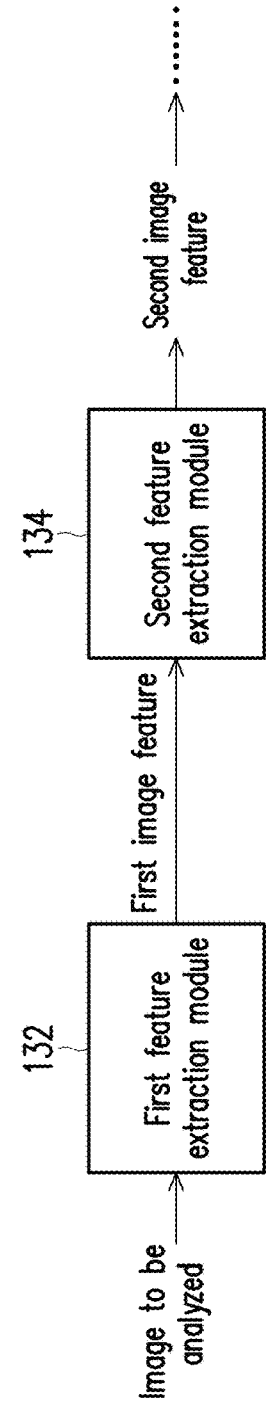
FIG. 4 and FIG. 5 are operation schematic diagrams of a feature extraction unit according to an embodiment of the invention.
Figure 5:
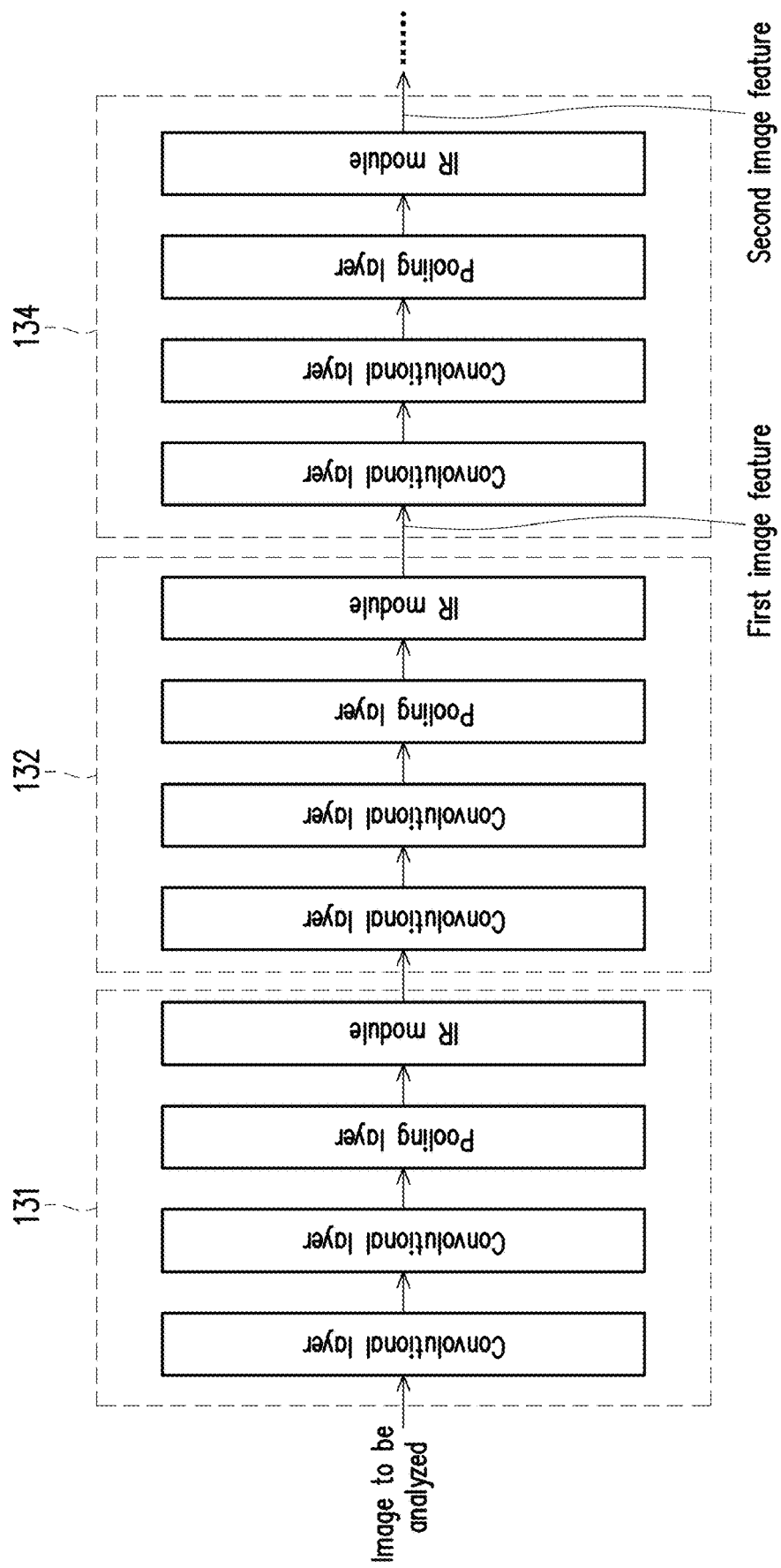

FIG. 4 and FIG. 5 are operation schematic diagrams of a feature extraction unit according to an embodiment of the invention. Details of the step S220 are described below with reference of FIG. 4 and FIG. 5.

In the embodiment, the feature extraction unit 130 has at least one feature extraction module. The feature extraction module has a feature extraction layer and a feature dimension reduction layer. The feature extraction unit 130 at least has a first feature extraction module 132 and a second feature extraction module 134. The feature extraction layer in each of the feature extraction modules 132, 134 has at least one convolutional layer and a pooling layer. The feature dimension reduction layer has an IR module, i.e. an inception module and a residual module.

After the feature extraction unit 130 inputs the images to be analyzed to the first feature extraction module 132, the convolutional layer may output a specific number of feature maps. Then, the feature maps may be input to the pooling layer to sample the feature maps to obtain the intermediate image features. In the embodiment, the pooling layer is implemented by 2 (i.e. to extract the maximum feature value for a 2×2 segment), though the invention is not limited thereto. The intermediate image features are further input to the feature dimension reduction layer, i.e. the IR module (the inception module and the residual module). The inception module adopts a convolutional kernel with a size of 3×3 and 1×1 to extract the corresponding intermediate image features, and the residual module adds a short cut to learn identity mapping. Namely, the inception module and the residual module process the intermediate image features to add a convolutional kernel with the size of 1×1, and integrate a proper number of 3×3 convolutional kernels to obtain a first image feature. Namely, the first image feature generated by the inception module and the residual module is generated through the convolutional kernels with the sizes of 1×1 and 3×3, and the number of the feature maps obtained through such convolutional kernel is the same with the number of the feature maps obtained through the convolution kernel with the size of 3×3. However, the former uses less parameters than that of the latter. Therefore, through the processing of the inception module and the residual module, the number of the parameters may be effectively reduced to reduce the time required for image processing.

It should be noted that in another embodiment of the invention, the feature extraction unit 130 may further perform batch normalization on the first image feature to change the value of the first image feature from different scales and specifications to an interval of 0-1. In this way, a uniform specification is adopted among a plurality of different feature extraction modules, so that the image features generated by each of the feature extraction modules may be stably converged.

In an embodiment of the invention, the first image feature is further input to the second feature extraction module 134 to obtain a second image feature corresponding to the image to be analyzed. An operation method of the second feature extraction module 134 is similar to that of the first feature extraction module 132, and detail thereof is not repeated.

It should be noted that the number of the feature extraction modules is not limited by the invention. In another embodiment of the invention, the feature extraction unit 130 further has six sets of feature extraction modules, and the image feature generated by each set of the feature extraction module serves an input of the feature extraction module of a next stage, so as to extract the image feature of the stage.

Moreover, referring to FIG. 5, in the embodiment, there is another feature extraction module 131 before the first feature extraction module 132. Namely, in the embodiment, a feature extraction module with a second order in the feature extraction modules is taken as the first feature extraction module 132, and a feature extraction module with a third order in the feature extraction modules is taken as the second feature extraction module 134, though the invention is not limited thereto. To be specific, since the image feature generated by the feature extraction module 131 with a first order is not necessarily close to an actual image feature, even if the image feature generated by the feature extraction module 131 with the first order is adopted, an influence on the accuracy of the finally output estimated optical flow result is not significant. Considering the time cost, the image features generated by the feature extraction module 131 may be selectively not applied to the subsequent process of estimating the optical flow, which is not limited by the invention.

Figure 6:
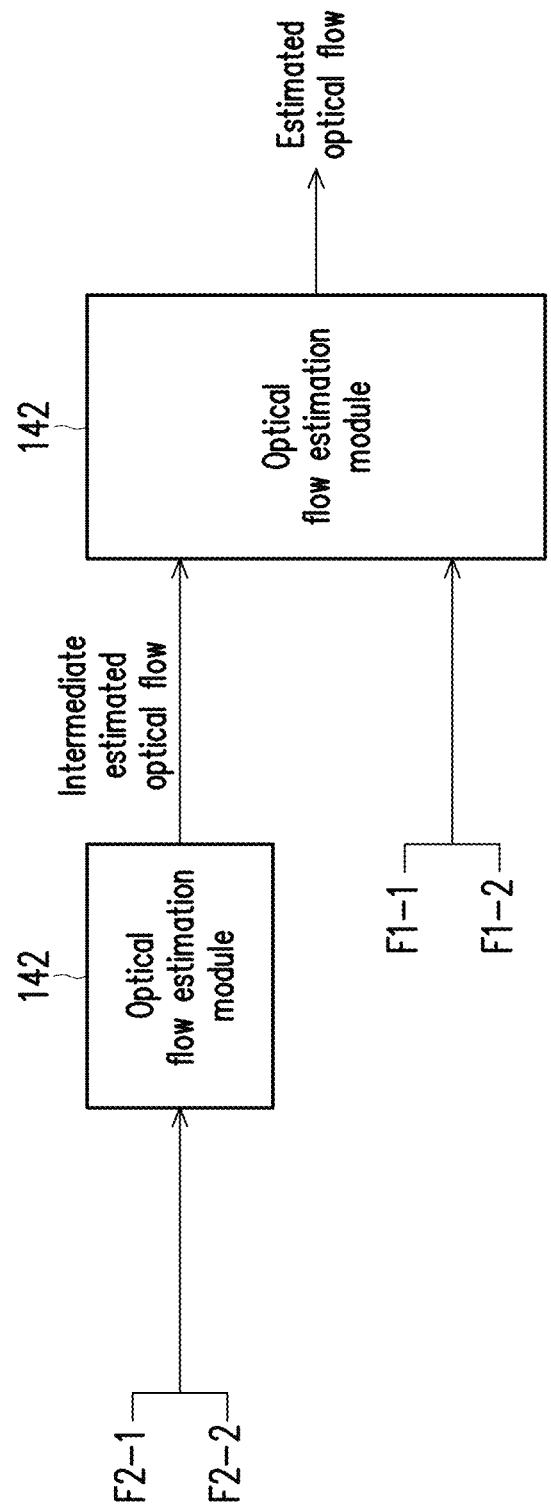
FIG. 6 and FIG. 7 are operation schematic diagrams of an optical flow estimation unit according to an embodiment of the invention.
Figure 7:
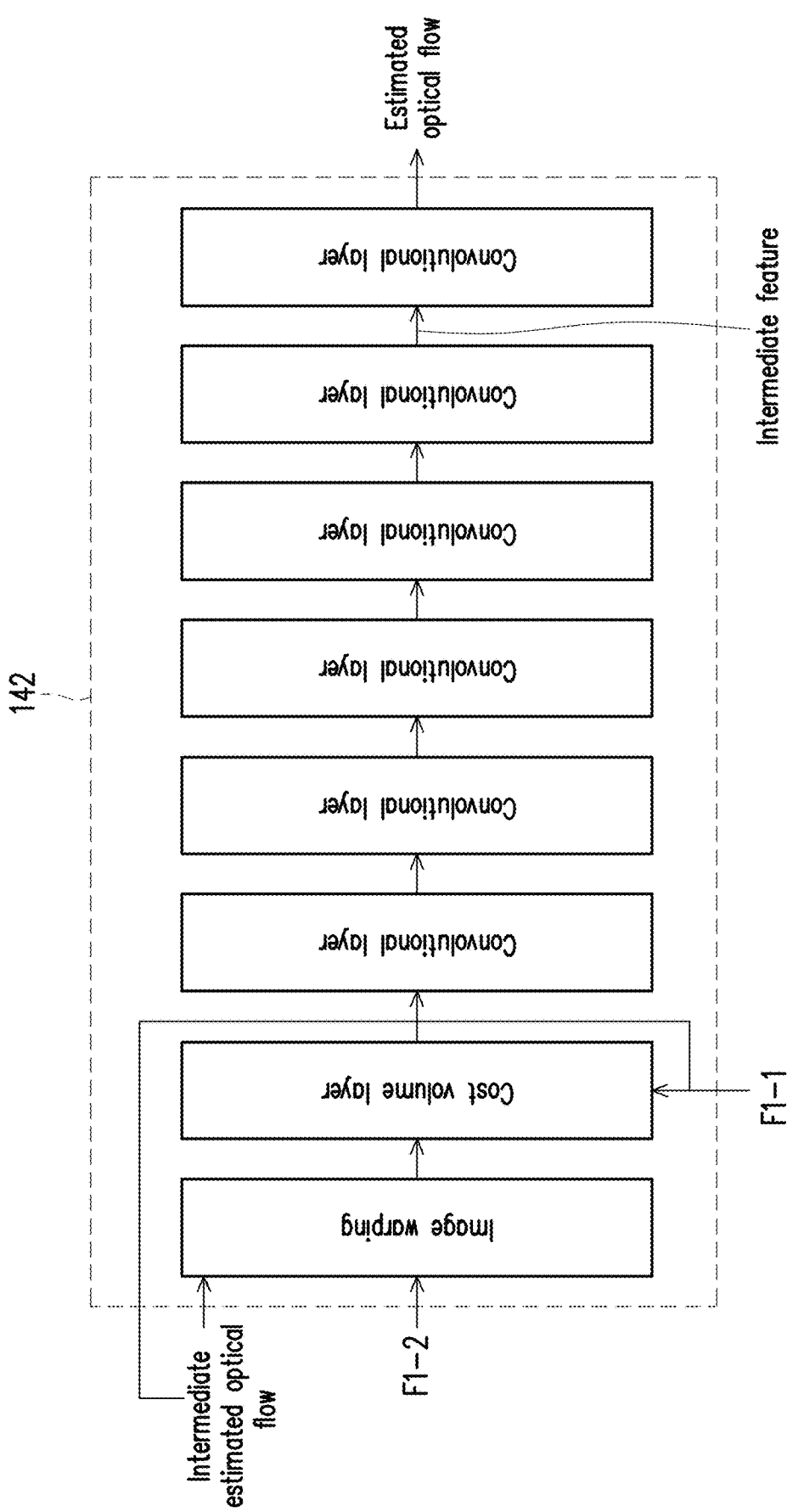

FIG. 6 and FIG. 7 are operation schematic diagrams of an optical flow estimation unit according to an embodiment of the invention. Details of the step S230 are described below with reference of FIG. 6 and FIG. 7.

The optical flow estimation unit 140 may receive and input a second image feature F2-1 corresponding to the first image to be analyzed and a second image feature F2-2 corresponding to the second image to be analyzed to the optical flow estimation module. In an embodiment of the invention, the optical flow estimation module 142 has a pre-processing layer (i.e. a warping processing layer and a cost volume layer) and six-layer of convolutional layers. The second image feature F2-2 corresponding to the second image to be analyzed is first pre-processed, i.e. the second image feature F2-2 is first subjected to an image warping processing, and a result of the warping processing is convolved by the second image feature F2-1 corresponding to the first image to be analyzed through a cost volume layer, so as to calculate a correlation between pixels of the two feature maps, i.e. a second pre-processing result. The second pre-processing result and the second image feature F2-1 corresponding to the first image to be analyzed are integrated into a second optical flow feature set, and through the six-layer of convolutional layers, an intermediate estimated optical flow corresponding to the second image features F2-1, F2-2 is acquired.

Then, the intermediate estimated optical flow corresponding to the second image features F2-1, F2-2, the first image feature F1-1 corresponding to the first image to be analyzed and the first image feature F1-2 corresponding to the second image to be analyzed are altogether input to a next optical flow estimation module. Now, the first image feature F1-2 corresponding to the second image to be analyzed and the intermediate estimated optical flow corresponding to the second image features F2-1, F2-2 are pre-processed, i.e. the first image feature F1-2 and the estimated optical flow corresponding to the second image features F2-1, F2-2 are first subjected to the image warping processing, and a result of the warping processing is convolved by the first image feature F1-1 corresponding to the first image to be analyzed through the cost volume layer, so as to calculate a correlation between pixels of the two feature maps, and an output of the cost volume layer is a first pre-processing result. The first pre-processing result, the intermediate estimated optical flow corresponding to the second image features F2-1, F2-2 and the first image feature F1-1 may be integrated into a first optical flow feature set, and through the six-layer of convolutional layers, an estimated optical flow is acquired. In other words, the images to be analyzed include the first image to be analyzed and the second image to be analyzed, and the first image to be analyzed and the second image to be analyzed respectively correspond to the first image features F1-1, F1-2 and the second image features F2-1, F2-2. The optical flow estimation unit 140 pre-processes the second image feature F2-2 corresponding to the second image to be analyzed to generate a second pre-processing result, and integrates the second pre-processing result and the first image feature F1-2 corresponding to the second image to be analyzed into a second image feature set, and extracts a feature of the second image feature set to generate an intermediate estimated optical flow. The optical flow estimation unit 140 further perform pre-processing on the intermediate estimated optical flow and the first image feature F1-2 of the second image to be analyzed to generate a first pre-processing result, and integrates the first pre-processing result and the first image feature F1-1 corresponding to the first image to be analyzed into a first image feature set, and extracts a feature of the first image feature set to generate the estimated optical flow.

Figure 8:
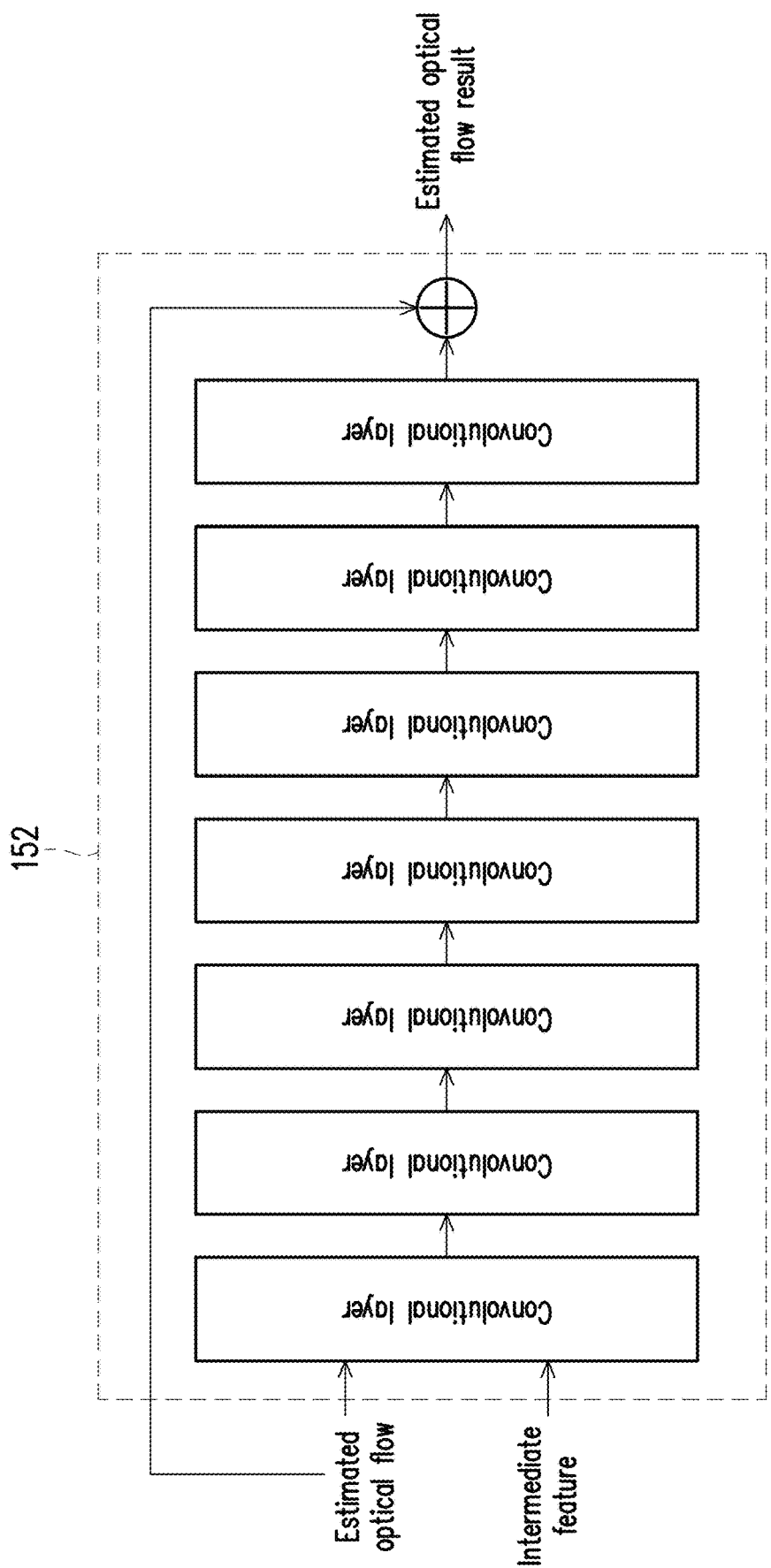
FIG. 8 is an operation schematic diagram of a refining unit according to an embodiment of the invention.

FIG. 8 is an operation schematic diagram of a refining unit according to an embodiment of the invention. Details of the step S240 are described below with reference of FIG. 8.

In the embodiment, the refining unit 150 includes a refining module 152. The refining unit 150 may input an intermediate feature of the first optical flow feature set and the estimated optical flow to the refining unit 152. In the embodiment, the refining module 152 has seven-layer of convolutional layers. The intermediate feature is a feature produced by the optical flow estimation unit 140 in the middle of operation. Referring to FIG. 7 again, after each layer of the convolutional layer in the optical flow estimation unit 140, a set of features produced in the layer is generated. In the embodiment, the intermediate feature output by the first optical flow feature set at the sixth layer of the convolutional layer is adopted. To be specific, in the embodiment, only the finally generated estimated optical flow is refined, so that the adopted intermediate feature is the intermediate feature coming from the first optical flow feature set. Moreover, compared to the first to the fifth layers of the convolutional layer, since the intermediate feature output by the sixth layer of the convolutional layer is more accurate, and is different to the finally output estimated optical flow, the refining unit 150 of the embodiment adopts the intermediate feature output by the sixth layer of the convolutional layer, though the invention is not limited thereto. It should be noted that if the convolutional layers of the optical flow estimation unit 140 of the other embodiment is not seven layers, the refining unit 150 may arbitrarily extract the intermediate feature output by the second-to-last layer of the convolutional layer, or adopt the intermediate feature output by other layers, which is not limited by the invention.

After the processing of the refining module 152, the refining unit 150 generates an estimated optical flow feature corresponding to the estimated optical flow. Then, the refining unit 150 integrates the extracted estimated optical flow feature and the estimated optical flow (i.e. to add the extracted image features with the estimated optical flow points point-by-point to highlight the image feature in the estimated optical flow) to generate the estimated optical flow result.

It should be noted that in the embodiment of the invention, the convolutional layer adopted by the refining module is a dilation convolutional layer, so as to increase a receptive field of each convolutional layer to improve the accuracy of the output estimated optical flow.

Figure 9:
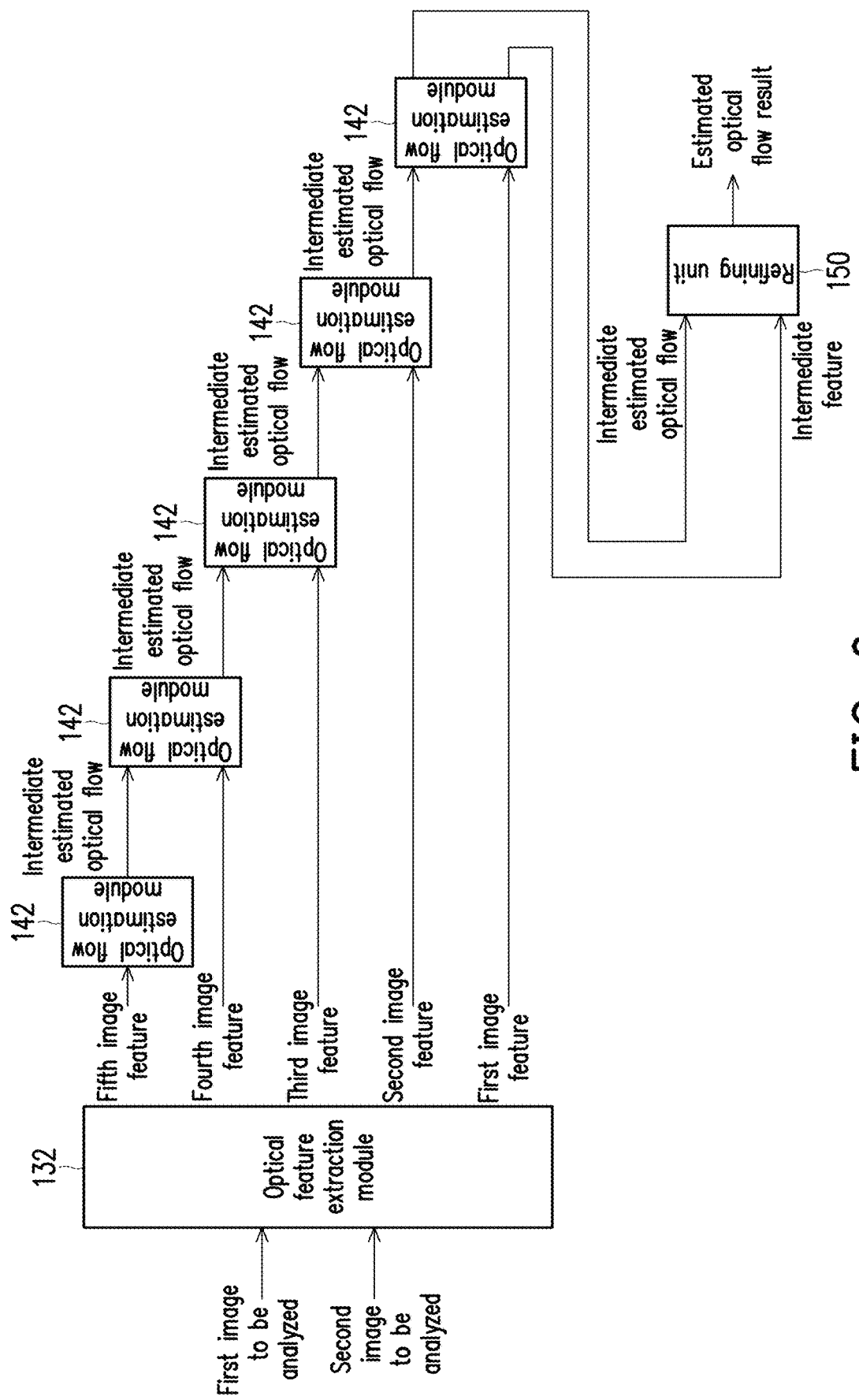
FIG. 9 is a flowchart illustrating a method for estimating optical flow according to another embodiment of the invention.

FIG. 9 is a flowchart illustrating a method for estimating optical flow according to another embodiment of the invention. Referring to FIG. 9, in the embodiment, the first image to be analyzed and the second image to be analyzed are input to the feature extraction module 132, and through at least five feature extraction modules, a first image feature, a second image feature, a third image feature, a fourth image feature and a fifth image feature corresponding to the first image to be analyzed and the second image to be analyzed are respectively generated. The fifth image feature is input to the optical flow estimation module to output a corresponding intermediate estimated optical flow, which is input to another optical flow estimation module 142 together with the fourth image feature to output another corresponding intermediate estimated optical flow, and others are deduced by analogy. Finally, the first image feature and the intermediate estimated optical flow and the intermediate feature of the previous stage are altogether input to the refining module 152 to obtain a final estimated optical flow result. Details of the embodiment of FIG. 9 are the same to the embodiments of FIG. 1 to FIG. 8, and the difference only lies in the number of the feature extraction modules and the number of the optical flow estimation modules, and detail thereof is not repeated.

Figure 10:
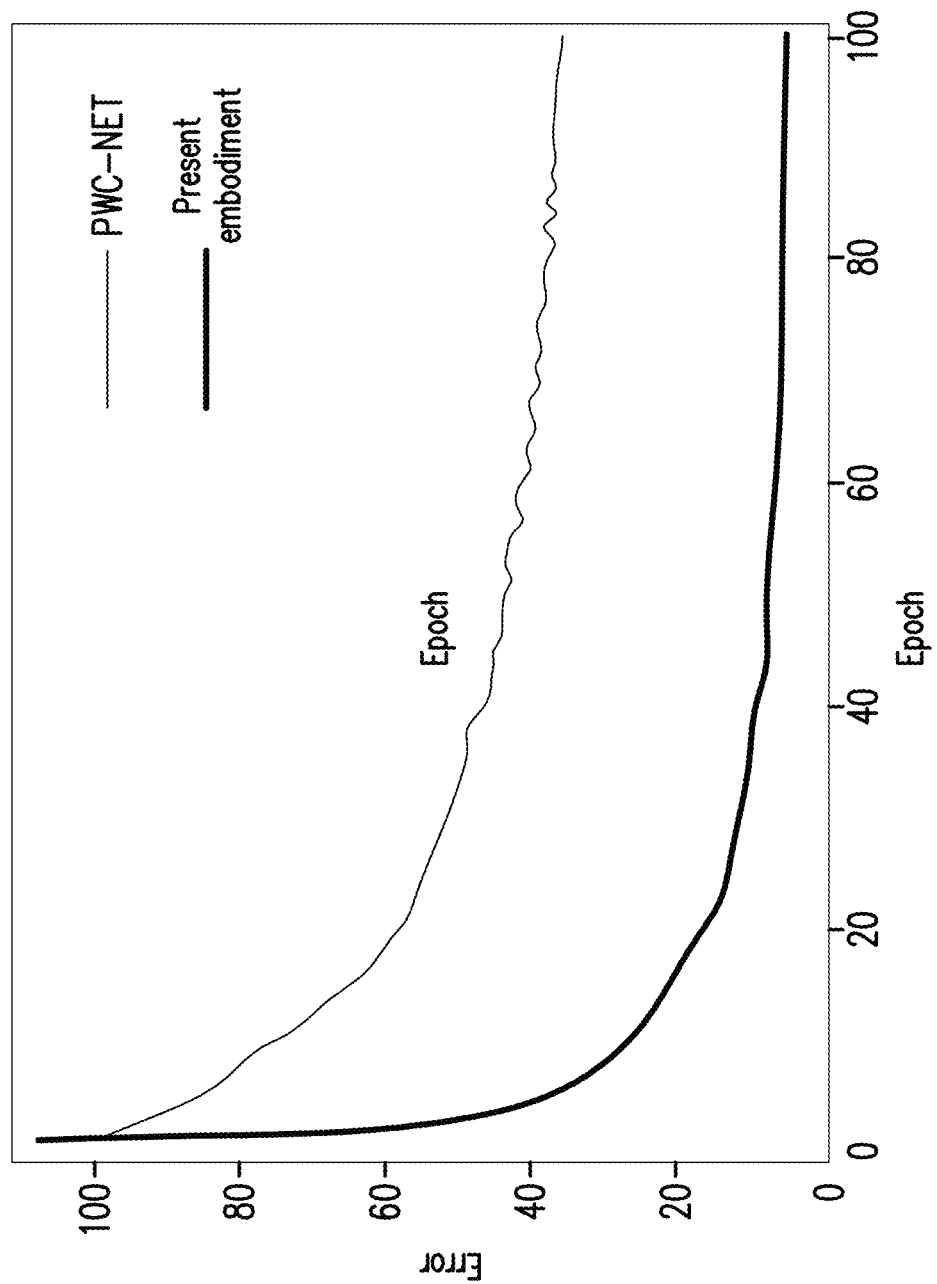
FIG. 10 is a schematic diagram of an experiment result of the method for estimating optical flow according to an embodiment of the invention.

FIG. 10 is a schematic diagram of an experiment result of the method for estimating optical flow according to an embodiment of the invention. In an experimental case, 4000 pairs of images in a dataset FlyingChairs generated by FlowNet simulation are taken for training, and 1000 pairs of images are used as test data. Moreover, in such experiment, the PWC-NeT and the method for estimating optical flow of the embodiment of FIG. 9 are adopted to train and test the aforementioned data. After 100 epochs of training, it is obvious that compared with the PWC-NeT, the method for estimating optical flow adopted in the embodiment of FIG. 9 may greatly reduce the error between 0 and 20 epochs, so that the time required for training is effectively reduced.

In summary, in the electronic device and the method for estimating optical flow of the invention, by configuring the feature dimension reduction layer, the amount of parameters required for estimating optical flow is reduced, so as to effectively reduce a time required for training. Besides, by using the feature extraction unit to perform batch normalization on the image feature, the different feature extraction modules may adopt the uniform specification, so that the generated image features may be stably converged.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents. Moreover, any embodiment of or the claims of the invention is unnecessary to implement all advantages or features disclosed by the invention. Moreover, the abstract and the name of the invention are only used to assist patent searching. Moreover, "first", "second", etc. mentioned in the specification and the claims are merely used to name the elements and should not be regarded as limiting the upper or lower bound of the number of the components/devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An electronic device, configured to estimate an optical flow and adapted to connect an image acquiring unit, wherein the image acquiring unit acquires a plurality of images to be analyzed, comprising:
    a storage unit, storing a feature extraction module, wherein the feature extraction module comprises a feature extraction layer and a feature dimension reduction layer, wherein the feature dimension reduction layer comprises an inception module and a residual module;
    a feature extraction unit, connected to the image acquiring unit and the storage unit, and configured to respectively input the images to be analyzed to the feature extraction module, such that the images to be analyzed are input to the feature extraction layer to respectively generate intermediate image features corresponding to the images to be analyzed, and the intermediate image features corresponding to the images to be analyzed are respectively input to the feature dimension reduction layer, so that the intermediate image features are subjected to a dimension reduction process to respectively generate image features;
    an optical flow estimation unit, connected to the feature extraction unit, and configured to input the image feature of each of the images to be analyzed to an optical flow estimation module to generate an estimated optical flow; and
    a refining unit, connected to the optical flow estimation unit, and configured to input the estimated optical flow to a refining module to extract an estimated optical flow feature of the estimated optical flow, and integrating the estimated optical flow feature to the estimated optical flow to obtain an estimated optical flow result.

2. The electronic device as claimed in claim 1, further comprising:
an image blending unit, connected to the refining unit, and integrating the plurality of images to be analyzed according to the estimated optical flow result, so as to obtain a panoramic image.

3. The electronic device as claimed in claim 1, wherein the feature extraction module comprises a first feature extraction module and a second feature extraction module,
wherein the feature extraction unit inputs the plurality of images to be analyzed to the first feature extraction module to acquire a first image feature corresponding to each of the images to be analyzed,
the feature extraction unit further inputs the first image feature corresponding to each of the images to be analyzed to the second feature extraction module to acquire a second image feature corresponding to each of the images to be analyzed.

4. The electronic device as claimed in claim 1, wherein the feature extraction module comprises a first feature extraction module and a second feature extraction module,
wherein the feature extraction unit inputs the plurality of images to be analyzed to the first feature extraction module to acquire a first image feature corresponding to each of the images to be analyzed,
the feature extraction unit further performs batch normalization on the first image feature corresponding to each of the images to be analyzed,
the feature extraction unit further inputs the normalized first image feature corresponding to each of the images to be analyzed to the second feature extraction module to obtain a second image feature corresponding to each of the images to be analyzed,
the feature extraction unit further performs batch normalization on the second image feature corresponding to each of the images to be analyzed.

5. The electronic device as claimed in claim 1, wherein the images to be analyzed comprise a first image to be analyzed and a second image to be analyzed, and the first image to be analyzed and the second image to be analyzed respectively correspond to a first image feature and a second image feature,
wherein the optical flow estimation unit performs pre-processing on the second image feature of the second image to be analyzed to generate a second pre-processing result, and integrates the second pre-processing result and the first image feature corresponding to the second image to be analyzed into a second image feature set, and extracts a feature of the second image feature set to generate an intermediate estimated optical flow,
wherein the optical flow estimation unit further performs pre-processing on the intermediate estimated optical flow and the first image feature of the second image to be analyzed to generate a first pre-processing result, and integrates the first pre-processing result and the first image feature corresponding to the first image to be analyzed into a first image feature set, and extracts a feature of the first image feature set to generate the estimated optical flow.

6. The electronic device as claimed in claim 5, wherein the optical flow estimation unit further extracts an intermediate feature of the first image feature set, the refining unit acquires the estimated optical flow feature according to the estimated optical flow and the intermediate feature.

7. The electronic device as claimed in claim 1, wherein the feature extraction layer comprises at least one convolutional layer and a pooling layer.

8. The electronic device as claimed in claim 1, wherein the refining unit inputs the estimated optical flow to a dilation convolutional layer to extract the estimated optical flow feature of the estimated optical flow.

9. A method for estimating optical flow, comprising:
acquiring a plurality of images to be analyzed;
respectively inputting the images to be analyzed to a feature extraction module, wherein the feature extraction module comprises a feature extraction layer and a feature dimension reduction layer, wherein the feature dimension reduction layer comprises an inception module and a residual module, and the images to be analyzed are input to the feature extraction layer to respectively generate intermediate image features corresponding to the images to be analyzed, and the intermediate image features corresponding to the images to be analyzed are respectively input to the feature dimension reduction layer, so that the intermediate image features are subjected to a dimension reduction process to respectively generate image features;
inputting the image feature of each of the images to be analyzed to an optical flow estimation module to generate an estimated optical flow; and
inputting the estimated optical flow to a refining module to extract an estimated optical flow feature of the estimated optical flow, and integrating the estimated optical flow feature to the estimated optical flow to obtain an estimated optical flow result.

10. The method for estimating optical flow as claimed in claim 9, further comprising:
integrating the plurality of images to be analyzed according to the estimated optical flow result, so as to obtain a panoramic image.

11. The method for estimating optical flow as claimed in claim 9, wherein the feature extraction module comprises a first feature extraction module and a second feature extraction module, and the step of respectively inputting the images to be analyzed to the feature extraction module further comprises:
inputting the plurality of images to be analyzed to the first feature extraction module to acquire a first image feature corresponding to each of the images to be analyzed; and
inputting the first image feature corresponding to each of the images to be analyzed to the second feature extraction module to acquire a second image feature corresponding to each of the images to be analyzed.

12. The method for estimating optical flow as claimed in claim 9, wherein the feature extraction module comprises a first feature extraction module and a second feature extraction module, and the step of respectively inputting the images to be analyzed to the feature extraction module further comprises:
inputting the plurality of images to be analyzed to the first feature extraction module to acquire a first image feature corresponding to each of the images to be analyzed;
performing batch normalization on the first image feature corresponding to each of the images to be analyzed;

inputting the normalized first image feature corresponding to each of the images to be analyzed to the second feature extraction module to obtain a second image feature corresponding to each of the images to be analyzed; and performing batch normalization on the second image feature corresponding to each of the images to be analyzed.

13. The method for estimating optical flow as claimed in claim 9, wherein the images to be analyzed comprise a first image to be analyzed and a second image to be analyzed, and the first image to be analyzed and the second image to be analyzed respectively correspond to a first image feature and a second image feature, and the step of inputting the image feature of each of the images to be analyzed to the optical flow estimation module to generate the estimated optical flow further comprises:

performing pre-processing on the second image feature of the second image to be analyzed to generate a second pre-processing result, and integrating the second pre-processing result and the first image feature corresponding to the second image to be analyzed into a second image feature set, and extracting a feature of the second image feature set to generate an intermediate estimated optical flow; and performing pre-processing on the intermediate estimated optical flow and the first image feature of the second image to be analyzed to generate a first pre-processing result, and integrating the first pre-processing result and the first image feature corresponding to the first image to be analyzed into a first image feature set, and extracting a feature of the first image feature set to generate the estimated optical flow.

14. The method for estimating optical flow as claimed in claim 13, wherein the step of inputting the estimated optical flow to the refining module to extract the estimated optical flow feature of the estimated optical flow further comprises:

extracting an intermediate feature of the first image feature set; and acquiring the estimated optical flow feature according to the estimated optical flow and the intermediate feature.

15. The method for estimating optical flow as claimed in claim 9, wherein the feature extraction layer comprises at least one convolutional layer and a pooling layer.

16. The method for estimating optical flow as claimed in claim 9, wherein the estimated optical flow is input to a dilation convolutional layer to extract the estimated optical flow feature of the estimated optical flow.

* * * * *